United States Patent
Kopf et al.

(10) Patent No.: US 10,717,905 B2
(45) Date of Patent: Jul. 21, 2020

(54) ADHESIVE COMPOUND

(71) Applicant: Lohmann GmbH & Co. KG, Neuwied (DE)

(72) Inventors: Patrik Kopf, Neuwied (DE); Vincent Leon, Koblenz (DE); Simone Wierschem, Roes (DE)

(73) Assignee: LOHMANN GMBH & CO. KG, Neuwied (DE)

( * ) Notice: Subject to any disclaimer, the term of this patent is extended or adjusted under 35 U.S.C. 154(b) by 0 days.

(21) Appl. No.: 15/735,730

(22) PCT Filed: Jun. 17, 2016

(86) PCT No.: PCT/EP2016/064038
§ 371 (c)(1),
(2) Date: Dec. 12, 2017

(87) PCT Pub. No.: WO2016/202994
PCT Pub. Date: Dec. 22, 2016

(65) Prior Publication Data
US 2018/0171191 A1 Jun. 21, 2018

(30) Foreign Application Priority Data
Jun. 17, 2015 (DE) .......... 10 2015 109 659

(51) Int. Cl.
*C09J 153/02* (2006.01)
*C09J 7/38* (2018.01)
(Continued)

(52) U.S. Cl.
CPC .......... *C09J 153/02* (2013.01); *C08K 5/0016* (2013.01); *C08K 5/0025* (2013.01); *C09J 7/26* (2018.01);
(Continued)

(58) Field of Classification Search
None
See application file for complete search history.

(56) References Cited

U.S. PATENT DOCUMENTS

| 4,133,731 A | 1/1979 | Hansen et al. |
| 5,229,206 A * | 7/1993 | Groves ................ C09J 151/00 428/344 |
| 2014/0255681 A1 * | 9/2014 | Epple ........................ C09J 7/26 428/317.3 |

FOREIGN PATENT DOCUMENTS

| CN | 101547988 A | 9/2009 |
| CN | 101547989 A | 9/2009 |

(Continued)

OTHER PUBLICATIONS

International Search Report and English translation dated Aug. 19, 2016 in International Application No. PCT/EP2016/064038 (4 pages).

(Continued)

*Primary Examiner* — Chinessa T. Golden
(74) *Attorney, Agent, or Firm* — Bookoff McAndrews, PLLC

(57) ABSTRACT

The invention relates to an adhesive compound containing a multi-armed vinyl aromatic block copolymer, one or more adhesive resins, and one or more auxiliary crosslinking agents. The invention also relates to an adhesive means comprising said adhesive compound and a carrier material and/or a cover. The invention also relates to a method for producing such an adhesive means. Compared to adhesive systems known up until now, such an adhesive means demonstrates clearly improved adhesion to hard, non-polar surfaces such as, for example, novel coated surfaces in the automotive industry.

20 Claims, 1 Drawing Sheet

(51) Int. Cl.
*C09J 7/26* (2018.01)
*C08K 5/00* (2006.01)
*C09J 7/40* (2018.01)

(52) U.S. Cl.
CPC ............... *C09J 7/387* (2018.01); *C09J 7/401* (2018.01); *C09J 2203/306* (2013.01); *C09J 2205/31* (2013.01); *C09J 2400/243* (2013.01); *C09J 2453/00* (2013.01); *C09J 2467/005* (2013.01)

(56) References Cited

FOREIGN PATENT DOCUMENTS

| CN | 102414284 | A | 4/2012 | | |
|----|-----------|---|--------|---|---|
| EP | 2226369 | A1 | * | 9/2010 | ............ C08F 220/18 |
| EP | 2226369 | A1 | | 9/2010 | |
| EP | 2690147 | A1 | | 7/2013 | |

OTHER PUBLICATIONS

Official Communication dated Mar. 5, 2019, in corresponding CN Application No. 201680034820.X (7 pages).

* cited by examiner

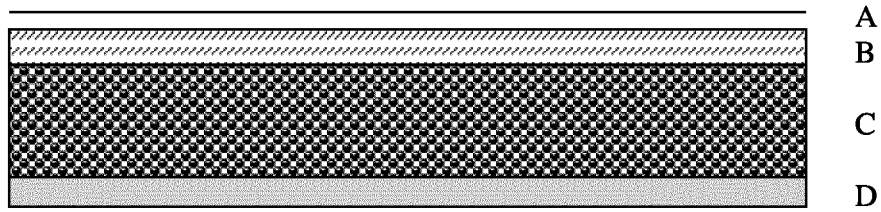

ADHESIVE COMPOUND

CROSS-REFERENCE TO RELATED APPLICATION(S)

This application is the U.S. national phase entry under 35 U.S.C. § 371 of International Application No. PCT/EP2016/064038, filed on Jun. 17, 2016, which claims priority under 35 U.S.C § 119 to German Patent Application No. 1020151096959.5, filed Jun. 17, 2015, the entireties of which are incorporated herein by reference.

The present invention relates to an adhesive compound which contains a multi-armed vinyl aromatic block copolymer, one or more adhesive resins as well as one or more auxiliary crosslinking agent(s). The present invention also relates to an adhesive means comprising the named adhesive compound and a carrier material and/or a cover. Furthermore, the invention comprises a method for producing such an adhesive means. Compared with adhesive systems known thus far, such an adhesive means displays a clear improvement in adhesion on hard, non-polar surfaces such as e.g. novel coated surfaces in the automotive industry.

Generally, an adhesive means is used to join together two substrates, resulting in a permanent connection. Special adhesive means products are for example used in the automotive industry for permanently sticking components to the body. Typical examples of this are fixing of emblems, as well as fixing plastic parts and rubber door seals.

Paints which are used preferably for coating surfaces in particular in the automotive field have to meet ever higher requirements of e.g. scratch resistance, gloss or heat or solvent resistance, and from an environmental point of view should also be free from solvents. In particular in respect of the last-named point, new production methods are used, such as powder coating, whereby the use of solvents is dispensed with. Also, nanoparticle technology is heavily used. Additionally, at present there are attempts to design coated surfaces to be self-restoring, i.e. that scratches repair themselves, e.g. when acted on at high temperatures.

As a consequence of this development, in particular the top coats of paint are harder these days, i.e. strongly crosslinked systems are used which are often provided with polysiloxanes and other additives which possess a substantially lower surface energy than previous coated surfaces. These paints can have superhydrophobic properties.

The requirements of adhesive means for fixing emblems, attachments or entry sills to these coats of paint have therefore increased. The adhesion is intended not only to have a high strength and durability but to develop this strength also immediately after adhesion, thus within minutes.

Foam tapes with foam carriers and adhesive layers based on polyacrylate are already known. The foam carrier can be designed to be substantially elastic; the foam carrier is then mostly based on polyolefins or polyurethane. Viscoelastic foam carriers mainly involve polyacrylates. The viscoelastic foam tapes are developed such that the foam carrier itself often already operates as an adhesive. Additional tacky layers can also be applied. These days, these tacky layers are likewise predominantly based on polyacrylate.

The disadvantage of the known polyacrylate-based foam tapes consists of the polyacrylate adhesive layers displaying only insufficient adhesion to low-energy surfaces, or the adhesion develops only over hours and days.

Therefore, adhesive layers based on synthetic rubber have been proposed for foam tapes with viscoelastic foam carriers. For example, patent application EP 2 226 369 A1 describes an adhesive tape with a viscoelastic foam carrier layer based on polyacrylate, wherein the adhesive layer is based on synthetic rubber. Additionally, this adhesive compound is chemically crosslinked by means of electron beam curing. A good adhesion to non-polar surfaces, combined with sufficient cohesion at higher temperature, is achieved by chemical crosslinking.

Patent application EP 2 690 147 A2 likewise describes an adhesive tape with a viscoelastic, acrylate-based foam layer. The adhesive compound is based on a mixture of at least two different synthetic rubbers. The adhesive compound is not crosslinked. Also, this adhesive tape displays high adhesive forces to the non-polar substrate polyethylene, sufficient cohesion at 70° C. and also stable peel values on steel immediately after adhesion, for up to 3 days.

The disadvantage of these adhesive tapes consists of the viscoelastic carriers frequently being adjusted to be very soft in order also to remain soft and flexible even at temperatures below −18° C. But this presupposes difficulties in dimensional stability at room temperature and above. Alternatively, they are adjusted to be very hard in order to have a low plasticity at room temperature, but then become brittle at low temperatures.

The object of the invention is to produce an adhesive compound and an adhesive means which have better properties than the adhesive compounds and adhesive means known in the prior art. In particular, an object of the present invention is to produce an adhesive compound and an adhesive means suitable for adhesion to surfaces with a low surface energy, and characterized by good adhesion to low-energy and/or superhydrophobic surfaces such as novel paints of the automotive industry. This object is achieved by the adhesive compound according to the claims and the adhesive means according to the claims.

Accordingly, the invention relates to an adhesive compound which contains at least one multi-armed vinyl aromatic block copolymer, at least one adhesive resin and at least one auxiliary crosslinking agent.

According to DIN 53501, polymers which are not crosslinked but are crosslinkable polymers and have rubber elastic properties at room temperature are called rubbers. Natural rubber consists of the monomer isoprene (2-methyl-1,3-butadiene, C5H8), which in extremely uniform structure is polymerized to terpene cis-1,4-polyisoprene. Natural rubber has a longer chain than all synthetic rubbers, cannot be melted, can only be crosslinked with additives, and therefore is less suitable for the present purposes.

Synthetic rubbers are macromolecular substances of synthetic origin. They have shorter chains, can therefore be melted or are actually liquid, and are therefore more suitable for producing the adhesive compound according to the invention. In principle, all types of synthetic rubbers can be used to produce the present adhesive compound, i.e. styrene butadiene rubber (SBR), polybutadiene (BR), isoprene rubber (IR), acrylonitrile butadiene rubber (NBR), chloroprene rubber (CR) or butyl rubber (HR), to name the most important here. In terms of topology, these types are present in linear, branched or star-shaped form.

However, styrene block copolymers (SBCs), i.e. synthetic polymers made of two "hard" styrene end blocks and isoprene (SIS) or butadiene (SBS), or also mixtures such as ethylene butylene (SEES) as "soft" center blocks, are preferably used here. SBCs are particularly suitable as adhesive components because the S blocks of different molecules cluster together at low temperature, and form a phase. Therefore, this rubber material retains its integrity well at room temperature, and is very cohesive. At higher temperatures, from approx. 80° C., the S blocks break apart, the rubber beings to melt, and cohesion fails. For this reason, SBCs are the preferred rubbers in hot-melt adhesives.

Particularly preferred elastomers are multi-armed vinyl aromatic block copolymers from the group of styrene block copolymers (SBC), preferably from the group of styrene isoprene block copolymers (SIB), styrene butadiene block copolymers (SBB) or styrene ethylene butylene block copolymers (SEBS), and/or a hydrogenation product of these block copolymers, wherein the block copolymer consists of blocks of vinyl aromatics and blocks of olefinic aliphatics. The multi-armed vinyl aromatic block copolymer is preferable a branched copolymer with more than 4, 5, 6, 7, 8, 9 or 10 side arms. The topology is preferably star-shaped. SBCs with a high branching of more than 10 side arms are particularly preferred. These SBCs are used in connection with a styrene content of approximately 10 to 80% or 15 to 40%. The inventors have discovered that the use of multi-armed vinyl aromatic block copolymers with a high branching with more than 10 side arms in connection with a low styrene content of approximately 10% is advantageous for producing the adhesive compound according to the invention, and contributes to good adhesive properties, high adhesive strength, temperature resistance and flexibility of the adhesive compounds according to the invention. Such a block copolymer is available for example under the name HT 1200 from Kraton Polymers.

A further component of the adhesive compound according to the invention forms at least one adhesive resin. Adhesive resins are tackifying substances, with the help of which adhesives can be formulated from suitable backbone polymers, i.e. the adhesive resins endow the backbone polymers e.g. adhesive, crosslinking and tackifying properties. A review of adhesive resins can be found generally in the chapter "Tackifier Resins," Donatas Satas, "Handbook of Pressure Sensitive Adhesive Technology," Second Edition, edited by Donatas Satas, Van Nostrand Reinhold New York, pages 527 to 544. Adhesive resins ensure the correct glass transition temperature (Tg) of the mixture and adhesion to specific substrates. Suitable glass transition temperatures are between approx. −50° C. and 5° C., preferably between approx. −40° C. and −25° C.

Adhesive resins can in principle be divided into synthetic (e.g. hydrocarbon resins), semi-synthetic (e.g. terpene phenolic resins) and natural resins and the derivatives thereof (colophonium derivatives). The hydrocarbon resins can be further divided into aliphatic hydrocarbon resins (usually synthesized from the C5 stream of crude oil processing), aromatic hydrocarbon resins (from the C9 stream of crude oil processing or also coal tar) and mixed resins of C5 and C9 components. During production (polymerization), further monomers can also be added, such as for example phenolic components. Furthermore, hydrocarbon resins can be present either completely or partially hydrogenated. In principle, all adhesive resins such as for example balsamic resin, terpene resins, terpene phenolic resins, aliphatic or aromatic hydrocarbon resins, indene coumarone resins and mixtures thereof are suitable for producing the adhesive compound according to the invention.

In the present invention, at least one adhesive resin is used, wherein preferably one of the possibly several adhesive resins comes from the group of aromatic hydrocarbon resins. A phenolically-modified aromatic hydrocarbon resin is particularly preferably used. A suitable phenolically-modified aromatic hydrocarbon resin is known under the name Novares NTA 100. One or more further adhesive resins can be contained in the adhesive compound according to the invention, for example a hydrogenated aliphatic hydrocarbon resin.

The adhesive resin combination of a phenolically-modified aromatic hydrocarbon resin and a hydrogenated aliphatic hydrocarbon resin is preferred.

The content of adhesive resin in the adhesive compound is of from 10 to 90%, or of from 20 to 90%, or of from 30 to 80% or of from 40 to 70% (percentage by weight) of the adhesive compound. If, in addition to the adhesive resin, a further soft resin is present, the above-named percentages by weight relate to the content of adhesive resin including soft resin in the adhesive compound. In this way, the inventors have discovered that an adhesive compound with particularly good adhesion properties can be produced which is suitable particularly for use in the automotive industry. The introduction temperature during use in the automotive industry is usually between −40° C. and +90° C. Therefore, an adhesive compound or an adhesive tape containing this adhesive compound for this use should still have sufficient shear strength even at +90° C. An adhesive compound for such an adhesive tape should therefore reach a SAFT (shear adhesion failure temperature) of more than 100° C.

The synthetic rubber component is usually crosslinked to improve the properties in respect of shear strength, temperature and solvent resistance and removability of the adhesive compound according to the invention. In so doing, a chemical crosslinking (e.g. covalent compounds) or a physical crosslinking (domain formation) come into question as crosslinking mechanisms. Crosslinking can be initiated by thermal influences, e.g. during the drying process of the solvent-containing adhesive compound, or by radiation influences (UV light, electron radiation).

The crosslinking of the multi-armed vinyl aromatic block copolymers by radical-forming electron-beam radicals is supported with an auxiliary crosslinking agent. The multi-armed vinyl aromatic block copolymers are chemically crosslinked with covalent bonds by irradiation with electron radiation.

In one embodiment of the adhesive compound according to the invention, the auxiliary crosslinking agent has the general formula R1n-C—X—R2m, wherein R1 represents any hydrocarbon chain and R2 represents terminal acrylate groups which are bonded to the central hydrocarbon atom C via an interim chain X, with $2 \leq m \leq 4$ and n=4−m. Alternatively, the auxiliary crosslinking agent has the general formula R1nR2mC-X—CR1nR2m, wherein R1 represents any hydrocarbon chain, R2 represents terminal acrylate groups which are bonded to the C atom via an interim chain, and X is a further, arbitrary interim chain which links the two C atoms to one another, with $1 \leq m \leq 3$ and n=3−m.

Preferably the auxiliary crosslinking agents contain at least two terminal acrylate groups. Such auxiliary crosslinking agents are available under the brand name Sartomer from Arkema, Ebecryl from Allnex, Laromer from BASF or Miramer from Miwon Commercial, wherein the Sartomer monomer SR 351 (trimethylolpropane triacrylate, TMPTA) is particularly preferred. The content of the auxiliary crosslinking agent is preferably of from 0.01 to 10% and particularly preferably of from 0.05 to 5% (percentage by weight) of the adhesive compound. The shear strength increases at temperatures above room temperature by suitable crosslinking. The temperature resistance of the adhesive compound or of an adhesive tape containing the adhesive compound thereby improves. In addition, the resistance to chemicals is improved. The removability of the adhesive compound or of an adhesive tape containing the adhesive compound can also be achieved with a suitable formulation.

In addition to the above-named components (i.e. multi-armed vinyl aromatic block copolymer, at least one adhesive resin, and at least one auxiliary crosslinking agent) the adhesive compound according to the invention can still contain further components. In a preferred embodiment, the adhesive compound contains a further adhesive resin and/or soft resin. Further adhesive resins are preferably balsamic resin and terpene resins, terpene phenolic resins, aliphatic or aromatic hydrocarbon resins, indene coumarone resins or mixtures thereof. Preferably, the at least one further adhesive resin is a terpene phenolic resin or a hydrogenated aliphatic hydrocarbon resin such as Regalite 1125. The adhesive properties of the adhesive compound according to the invention can be particularly well adjusted by using more than one adhesive resin.

Soft resins can be used to make the adhesive compound softer. Soft resins are not solid, but viscous, for example soft resins are oils. Preferably hydrogenated aliphatic hydrocarbon resins are used as soft resins, such as for example Regalite 1010. The content of soft resin is approximately of from 0 to 40%, but preferably of from approximately 10 to approximately 30% (percentage by weight) of the adhesive compound.

A possible disadvantage in the use of SBC adhesive compounds is the low long-term stability thereof. The unsaturated polymer is susceptible to oxidation reactions, therefore unsaturated compounds require ageing protection. In respect of the antioxidant, in principle the distinction is to be made between primary and secondary antioxidants. The primary antioxidants engage in the chain propagation step in a chain-disrupting manner, whereas the secondary or preventive antioxidants destroy hydroperoxide groups which trigger the start or branching of the chain. The antioxidants themselves are organic chemical substances to which are added a formulation in order to protect this against decomposition, oxidative degradation, premature ageing and autooxidation. Such additives are used in almost all areas of the chemical and pharmaceutical industry to make chemicals or products, naturally occurring compounds, plastics, foodstuffs and luxury foods, medicinal products and cosmetics more durable. A review of antioxidants which are current and can be used in principle in the present context is found e.g. in "Ullmanns Enzyklopadie der technischen Chemie," 4th edition, volume 8, pages 25 to 42 (1974). All antioxidants can be used in the adhesive compound according to the invention, for example from the group of cresols, here in particular 4,6-bis(alkylthioalkyl)-o-cresols, or Irganox® 1726, Irganox® 1010 or Irganox® 1520, but also all phenolic antioxidants such as Vulkanox® BFK or also all common antioxidants such as DOP (dioctylphthalate) can be used.

Furthermore, the adhesive compound according to the invention can contain a UV protection agent, in particular for outdoor applications. By way of example, hydroxyphenyl benzotriazoles which are marketed under the brand name Tinuvin® are named as suitable UV protection agents. The content of antioxidant and/or UV protection agent is typically between 0.01 and 10%, or between 0.05 to 5% (percentage by weight) of the adhesive compound according to the invention.

Additionally, depending on the intended effect, for example for coloring or also as defoaming agent, the additives which are to be found usually when producing adhesive substances, such as fillers, plasticizers, processing auxiliaries, activators, pigments, accelerators or retardants etc. can be used.

The adhesive compounds according to the invention are characterized by high adhesion values, high strength and high durability. After adhesion, the strength of the adhesive compounds according to the invention builds up quickly within a few minutes.

An adhesive means can be produced with the adhesive compound according to the invention. An adhesive means produced with the adhesive compound according to the invention can be present as a carrier-based, single or double-sided adhesively equipped adhesive means, or also as a carrierless adhesive means, with or without cover.

Any material which can carry the adhesive compound is suitable for carrier-based adhesive means. The carrier material can be selected from any of the known adhesive carrier materials, thus for example paper, sheets, metallized sheets, foam, meshes, viscoelastic materials and combinations of these named materials. Particularly suitable carrier materials are foams made from PE, PP, PB, PIB, PU, PVC, EVA, EPDM, polystyrene or polyacrylate. The carrier material preferably contains a flexible, elastic material which can preferably be compressed. Particularly preferably, the carrier material is a thermoplastic foam carrier which contains polyethylene, polyethylene vinyl acetate, polyurethane or mixtures thereof.

The carrier material has a suitable specific gravity and a suitable thickness depending on the desired softness, elasticity and strength. The specific gravity of the carrier material of the adhesive means according to the invention is usually of from approximately 50 to 900 kg/m3. Preferably, the carrier material has a specific gravity which moves in the range of from approximately 60 to 500 kg/m3, 70 to 400 kg/m3, 80 to 250 kg/m3 or approximately 100 to 200 kg/m3. Quite particularly preferably, the specific gravity of the carrier material is approximately 125 kg/m3. The carrier material can take on any thickness, but usually for the use of adhesives of parts on car paint, it is a thickness of from approximately 0.2 to 20 mm, or of from approximately 0.2 to 10 mm, or of from approximately 0.4 to 0.8 mm, preferably of from approximately 0.65 mm. The carrier material can in principle be present in any form, but preferably takes on the form of a rectangle, circle or strip.

Materials based on paper, plastic or mesh, well known for such purposes, can be used to provide protective cover of the adhesive means before use, if necessary coated in each case with a substance which supports removability from the adhesive surface such as e.g. polyvinyl alcohol or silicones. However, the cover is preferably a siliconized or non-siliconized sheet. The sheet preferably contains polyester, polypropylene and/or polyethylene terephthalate. The cover is preferably coated with a substance which supports removability, such as polyvinyl alcohol and/or silicon. The cover can also comprise a multilayer sheet which contains the above-named materials.

The adhesive means may be present with single or double-sided adhesion. Preferably, the adhesive means according to the invention has double-sided adhesion (see FIG. 1). The adhesive compound according to the invention is on the first side (see FIG. 1B) and preferably also on the second side of the adhesive means. Alternatively, the adhesive compound according to the invention is only on the first side of the adhesive means. In this case, there is another adhesive on the second side of the adhesive means (see FIG. 1D). Preferably, this other adhesive is an acrylate adhesive. The first side and the second side can be provided with a cover (see FIG. 1A) in order that the adhesive means is protected, in particular against dust and dirt.

If the adhesive means is intended to be rolled up on a strip, then one side of the adhesive means can also remain open (thus without cover). The cover of the one side of the adhesive tape can then also cover the other side of the adhesive tape by being rolled up. The cover is preferably designed such that, when rolling up the tape, the cover remains on the first side of the adhesive means on which is located the adhesive compound according to the invention and at the same time comes off the second side with the other adhesive at the same time. Preferably, when using the adhesive means, the first side can be stuck to the coated surface and the second side to an attachment part. By coating the adhesive means with two different adhesives, the adhesive means can be adapted particularly well to the materials to be stuck.

Preferably, the adhesive means is an adhesive tape in the form of a sheet, a roll or a stamped part. In principle, however, the adhesive means can take on any form which is required in the respective area of use.

When producing the adhesive means according to the invention, the at least one multi-armed vinyl aromatic block copolymer is mixed with at least one adhesive resin and at least one auxiliary crosslinking agent in a step (a). In a preferred embodiment, a solvent is added in this step. Alternatively, there is no solvent added in the named step. By adding a solvent, the components of the adhesive compound can be particularly well mixed. On the other hand, a particularly good environmental compatibility can be achieved by carrying out the method without solvent.

In organic solvents, the components of the adhesive compound are intimately mixed by means of a stirrer in the preferred solvent method. Preferably, paddle mixers, jet stream mixers and/or static mixers can be used.

In a further step (b), the adhesive compound product from step (a) is applied to a carrier material and/or a cover. The adhesive compound is applied to the cover or to the carrier material preferably in a coating process. The coating can take place by one of the well-known production methods, thus e.g. by means of knife coating, roller coating or nozzle application. The coating can also be carried out in the 100% system (hot-melt). In this case, the components of the adhesive compound are mixed in the melt or in the extruder without solvent, and preferably applied at high temperatures by a nozzle. The adhesive compound can be actively dried after coating, for example by warm air.

Thereafter, the applied adhesive compound is irradiated with electron beams in a third step (c). The electron beams serve for chemical crosslinking of the adhesive compound. The radiation can be carried out either directly or by the cover. In order to avoid secondary reactions and losses in efficiency, the radiation is carried out usually accompanied by an inert atmosphere (nitrogen). Electron beams with an energy of from 50 to 400 keV and a dose of from 20 to 400 kGy are used. For example, the accelerating voltage is between 80 and 300 kV, or between 90 and 200 kV or between 100 and 150 kV. Preferably, the accelerating voltage is approximately 180 kV. The dose of the electron beams is 30 to 300 kGy (kiloGray), 40 to 200 kGy or 50 to 100 kGy. The dose is preferably approximately 60 kGy.

The inventors have established that a "crosslinked" adhesive compound, and thus a "crosslinked" adhesive means, can be produced by chemical crosslinking by electron beams, which adhesive means combines a good adhesion also to substrates which are usually difficult to stick, with a high cohesion and temperature resistance, as is required in car manufacture. The peel and shear strength, solvent resistance and/or the removability of the adhesive compound can also be increased by suitable crosslinking. Accordingly, SAFT values of more than 100° C. can be achieved with the adhesive means.

It has been shown that the adhesive compound according to the invention and the adhesive means according to the invention are particularly suited to adhesion to coated surfaces, in particular also to such coated surfaces which have only a low surface energy and/or superhydrophobic properties, which is exactly the case with novel paints in the automotive industry.

DESCRIPTION OF THE FIGURES

The adhesive means is explained below in more detail using FIG. 1, without wishing to be limited by this exemplary representation in the teaching according to the invention. FIG. 1 shows an adhesive means according to the invention with cover (A), adhesive compound (B), carrier material (C) and adhesive (D).

In the production examples named below, the following test methods are used for validation. "Parts" always relates to parts by weight.

Determination of the Gel Value:

Approx. 0.2 g is weighed in from the transfer film (see examples) and this is added to a sealable glass flask. 50 mL toluene is added, and stirred. The mixture is left to stand for 2 days at room temperature. The crosslinking part swells, while the non-crosslinked part dissolves in the toluene. After 2 days, filtration takes place through a nylon filter (50-μm nylon filter, Eaton Sentinel NMO-50-PO1Z-60L). The weight of the filter is determined in advance. After filtration, subsequent rinsing with ample toluene takes place. The filter residue is dried at 110° C. for 4 h. Thereafter, the filter and residue is weighed. The gel value is calculated from the ratio of filter residue and weighed-in quantity. The measured value is the average of 3 individual measurements.

SAFT Test:

The transfer film is likewise used to measure the SAFT (shear adhesion failure temperature). This is laminated on an etched polyester sheet (thickness of 50 μm). Sample strips (width 25 mm) are cut from this. On a stainless steel plate (stainless steel according to Afera standard 4001, cleaned with gasoline in advance) the sample strip is stuck from the edge of the plate such that an area of 25 mm×25 mm is stuck. Then, rolling takes place twice over the sample strip (5 m/min) using a roller (weight 5 kg). The sample strip is heated for 10 min, vertically loaded with 1 kg (shearing load), and this arrangement is hung in a convection oven. A temperature program varies the temperature from 30° C. to 200° C. with a heating rate of 2K/min. The test result is the temperature at which the adhesive strip falls off. A cohesive fracture results from the shearing of the adhesive compound. The measured value is the average of 3 individual measurements.

Peel Strength 90°

The measurement of 90° peel strength is carried out with the foam adhesive tape (see examples). It takes place according to DIN ISO 1939 to in a standard atmosphere (23° C., 50% relative humidity). The substrate (aluminum sheet with 3-layer build-up of paint: filler, base coat and, as clear paint: 2K clearcoat ApO 1.2 from PPG) is wiped with a gasoline-soaked cloth and left to evaporate off. A 25-mm wide sample strip is applied to the substrate. The adhesive rear side is covered with an etched polyester sheet (thickness 50 μm). Then, rolling takes place twice over the sample strip (5 m/min) using a roller (weight 5 kg). The specimen is conditioned for 10 min or 24 hours in a standard atmosphere (23° C., 50% humidity) and then the force, which must be applied at a peeling angle of 90° at a speed of 100 mm/min, is measured in order to remove the adhesive tape from the substrate. In an adhesive tape with a foam carrier, the adhesion of the adhesive compound to the substrate should be great enough that it is more than the internal strength of the foam support. The foam then splits. Cohesion fracture and normal fracture with residues on the substrate then occur as further fracture patterns. The measured value is the average of 3 measurements.

Shear Strength at 23° C./4h

The foam adhesive tape is likewise used to measure this shear strength (see examples). The 25-mm wide strip of adhesive tape is prepared as in the SAFT test on stainless steel. The specimen is loaded, hanging vertically with different weights, in a standard atmosphere (23° C., 50% relative humidity). After 4 hours it is checked whether the arrangement is still holding or whether the adhesive strip has sheared off. The value for the shear strength is then the weight (in N) at which the strip remains in place. It is tested in steps of 10N. The measured value is the average of 3 individual measurements.

Shear Strength at 70° C.

The same specimen as in the shear strength test at 23° C. is used to measure this shear strength. The specimen is loaded with a weight of 500 g hanging vertically in a convection oven at 70° C. The time is measured until the strip shears off and falls. The measured value is the median of 3 individual measurements.

EXAMPLES

Example 1 (B1)

33 parts of the styrene block copolymer Kraton HT 1200 (multi-armed styrene block copolymer, branching more than 10 arms, star-shaped, Kraton Polymers) was dissolved in 300 parts of a solvent mixture of gasoline and methyl ethyl ketone (80:20). To this were added 24.5 parts Novares NTA 100 (phenolically-modified aromatic hydrocarbon resin), 20.5 parts Regalite 1125 (hydrogenated aliphatic hydrocarbon resin, adhesive resin) and 20.5 parts Regalite 1010 (hydrogenated aliphatic hydrocarbon resin, soft resin, both from Eastman). As further components 0.5 parts Sartomer SR 351 (TMPTA, crosslinker, Arkema) and 0.5 parts Irganox 1010 (phenolic antioxidant, BASF) were added. The mixture was stirred until homogeneity was achieved. The resulting solvent adhesive compound was scratched out on a siliconized polyester sheet (thickness 50 µm) by means of steel blades, firstly at room temperature for 10 minutes, and then dried in the convection oven for 5 min at 110° C. The thickness of the scratch was chosen such that the application weight after drying is 90 g/m². The adhesive film was covered with a further siliconized polyester sheet (thickness 50 µm) and subjected to electron radiation (180 kV, 60 kGy) in a nitrogen atmosphere. A transfer film was thus obtained. Both sides of the transfer film were laminated on a carrier foam to produce the adhesive tape according to the invention. The carrier foam (black, closed-cell, polyethylene foam, Alveo, TMA, specific gravity 125 kg/m³, thickness 0.65 mm) was firstly pre-treated on both sides with corona radiation. The transfer film was then laminated onto both sides such that the adhesive sheets were transferred onto the foam.

Comparative Example 1 (VB1)

As example 1, but without the addition of Sartomer SR 351.

Comparative Example 2 (VB2)

As example 1, but without electron radiation.

Comparative Example 3 (VB3)

As example 1, but a linear SIS (Kraton D 1161) was used as styrene block copolymer.

Comparative Example 4 (VB4)

As example 1, but a linear SBS (Kraton D 1101) was used as styrene block copolymer.

Comparative Example 5 (VB5)

As example 1, but a linear SEBS (Kraton G 1657) was used as styrene block copolymer.

Comparative Example 6 (VB6)

As example 1, but a radial SIS with approximately 4 arms (Kraton D 1124) was used as styrene block copolymer.

Comparative Example 7 (VB7)

As example 1, but a radial, approximately four-armed SIS (Vector 4187 A from Dexco, approx. 78% diblock proportion) was used as styrene block copolymer.

Comparative Example 8 (VB8)

As example 1, but a further radial, approximately four-armed SIS (Vector 4230 A from Dexco, approx. 30% diblock proportion) was used as styrene block copolymer.

Example 9 (B9)

As example 1, but Miramer M 200 (hexamethylene diacrylate) from Miwon Commercial was used in the same concentration as crosslinker instead of Sartomer SR 351.

Example 10 (B10)

As example 1, but instead of Sartomer SR 351, Laromer TPGDA (tripropylene glycol diacrylate) from BASF was used as crosslinker in the same concentration.

Example 11 (B11)

As example 1, but instead of Sartomer SR 351, Ebecryl 40 (polyol tetraacrylate) from Allnex was used as crosslinker in the same concentration.

a) Gel values (crosslinked proportion) and SAFT (shear adhesion failure temperature) values

|  | B1 | VB1 | VB2 | VB3 | VB4 |
|---|---|---|---|---|---|
| Gel value in % | 33 | approx. 0 | approx. 0 | approx. 0 | approx. 0 |
| SAFT in °C. | 122 | 77 | 72 | 85 | 82 |

|  | VB5 | VB6 | VB7 | VB8 | B9 | B10 | B11 |
|---|---|---|---|---|---|---|---|
| Gel value in % | approx. 0 | approx. 0 | approx. 0 | approx. 0 | 35 | 38 | 37 |
| SAFT in °C. | 77 | 84 | 77 | 77 | 117 | 116 | 127 | b) Peel strengths and shear strengths

|  | B1 | VB1 | VB2 |
|---|---|---|---|
| Peel strength 90° after 10 min | 15 N/cm | 14 N/cm | 15 N/cm |
| Peel strength 90° after 24 h | 20 N/cm | 20 N/cm | 20 N/cm |
| Shear strength at 23° C./4 h | 180 N | 180 N | 180 N |
| Shear strength at 70° C. (500 g/625 mm²) | >360 h | 1 h | <1 h |

Table a) shows that only the adhesive compound according to the invention according to Ex. 1 could be crosslinked with electron beams, thus resulting in a significant gel proportion and increased SAFT value. Mixtures with block copolymers with fewer side arms could likewise not be crosslinked (VB3 to VB8). Other multifunctional, terminal acrylate monomers can also be used (B9 to B11) as auxiliary crosslinking agents, in addition to Sartomer SR 351. Table b) shows that only adhesive compounds according to the invention lead to adhesive means which display both good peel strengths and also good shear strengths at increased temperatures.

The invention claimed is:

1. An adhesive compound containing:
   at least one multi-armed vinyl aromatic block copolymer with more than 10 side arms;
   at least one adhesive resin; and
   at least one auxiliary crosslinking agent,
   wherein the adhesive compound contains:
   10-80% of the at least one multi-armed vinyl aromatic block copolymer with more than 10 side arms,
   20-90% of the at least one adhesive resin and a soft resin,
   0.05-5% of the at least one auxiliary crosslinking agent, and
   0.05-5% of further additives including antioxidants and/or UV protection agents, wherein the percentages add up to 100.

2. The adhesive compound according to claim 1, characterized in that the at least one multi-armed vinyl aromatic block copolymer is an elastomer from a group of styrene block copolymers (SBC).

3. The adhesive compound according to claim 1, characterized in that at least one adhesive resin is an aromatic hydrocarbon resin.

4. The adhesive compound according to claim 1, characterized in that the at least one auxiliary crosslinking agent has a general formula selected from:
   a) $R^1_n$—C—X—$R^2_m$, wherein $R^1$ represents any hydrocarbon chain and $R^2$ represents terminal acrylate groups which are bonded to the central hydrocarbon atom X via an interim chain X, with 2≤m≤4 and n=4-m, or
   b) $R^1_n R^2_m$C—X—C$R^1_n R^2_m$, wherein $R^1$ represents any hydrocarbon chains, $R^2$ represents terminal acrylate groups which are bonded to the C atom via an interim chain, and X is any further arbitrary interim chain which links the two C atoms, with 1≤m≤3 and n=3-m.

5. The adhesive compound according to claim 4, characterized in that the at least one auxiliary crosslinking agent is a diacrylate monomer, a triacrylate monomer, a tetraacrylate monomer, or a high-numbered acrylate monomer.

6. The adhesive compound according to claim 1, characterized in that the adhesive compound contains at least one further adhesive resin and/or soft resin.

7. The adhesive compound according to claim 1, characterized in that the adhesive compound contains the antioxidants.

8. The adhesive compound according to claim 1, characterized in that the adhesive compound contains the UV protection agents.

9. The adhesive compound according to claim 1, which has been irradiated with electron beams.

10. An adhesive compound obtained from irradiating the adhesive compound according to claim 1 with electron beams.

11. An adhesive means containing:
    an adhesive compound according to claim 1; and
    a carrier material and/or a cover.

12. The adhesive means according to claim 11, characterized in that the carrier material is a thermoplastic foam carrier which contains polyethylene, polyethylene vinyl acetate, polyurethane or mixtures thereof.

13. The adhesive means according to claim 11, characterized in that the carrier material is a thermoplastic foam carrier which has a specific gravity of more than 50 kg/m³.

14. The adhesive means according to claim 11, characterized in that the cover is a siliconized or non-siliconized sheet which contains polyester, polyethylene, polypropylene and/or polyethylene terephthalate.

15. The adhesive means according to claim 11, characterized in that a first side and a second side of the adhesive means is adhesive, wherein the adhesive compound is on at least the first side.

16. The adhesive means according to claim 11 obtained from irradiating the adhesive compound with electron beams.

17. A method for producing an adhesive means, the method comprising:
    (a) forming the adhesive compound of claim 1;
    (b) applying the product from step (a) to a carrier material and/or a cover; and
    (c) irradiating the product from step (b) with electron beams.

18. The method according to claim 17, characterized in that a solvent is added in step (a).

19. The method according to claim 17, characterized in that no solvent is added in step (a).

20. A method of using the adhesive compound according to claim 1 for adhering to coated surfaces.

* * * * *